United States Patent
Kanekar et al.

(10) Patent No.: US 9,660,877 B1
(45) Date of Patent: *May 23, 2017

(54) TRANSACTION MANAGEMENT IN MULTI-PROTOCOL SDN CONTROLLER

(71) Applicant: Cisco Technology, Inc., San Jose, CA (US)

(72) Inventors: Bhushan Kanekar, Saratoga, CA (US); Giovanni Meo, Rome (IT); Madhu Venugopal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 14/475,657

(22) Filed: Sep. 3, 2014

Related U.S. Application Data (60) Provisional application No. 61/968,412, filed on Mar. 21, 2014.

(51) Int. Cl.
```
H04L 12/24      (2006.01)
H04L 29/06      (2006.01)
H04L 29/08      (2006.01)
```
(52) U.S. Cl.
CPC .............. *H04L 41/50* (2013.01); *H04L 29/06* (2013.01); *H04L 29/08072* (2013.01); *H04L 41/0213* (2013.01); *H04L 67/32* (2013.01); *H04L 69/02* (2013.01)

(58) Field of Classification Search
CPC ............... H04L 43/00; H04L 41/0213; H04L 29/08072; H04L 29/06; H04L 41/22; H04L 41/12; H04L 29/08171; H04L 12/2602; H04L 29/0809; H04L 29/08144; H04L 63/08; H04L 12/5695; H04L 69/18; H04L 67/10; H04L 69/08; H04L 45/00
USPC ........................................... 709/223; 370/254
See application file for complete search history.

(56) References Cited

U.S. PATENT DOCUMENTS

| | | |
|---|---|---|
| 5,889,846 A | 3/1999 | Ricciardi |
| 7,184,439 B1 | 2/2007 | Aubuchon et al. |
| 8,180,927 B2 | 5/2012 | Hallamaa et al. |
| 8,769,105 B2 | 7/2014 | Lacapra |
| 2002/0116453 A1 | 8/2002 | Todorov et al. |
| 2007/0011291 A1* | 1/2007 | Mi ........................ G06F 9/5072 709/223 |

(Continued)

*Primary Examiner* — Hee Soo Kim
*Assistant Examiner* — Mehulkumar Shah
(74) *Attorney, Agent, or Firm* — Edell, Shapiro & Finnan, LLC (57) ABSTRACT

A multi-protocol software-defined networking (SDN) controller receives receiving from one or more applications one or more requests for services to be performed by one or more of a plurality of network devices that communicate with the SDN controller by a plurality of different of SDN protocols. The requests are mapped to appropriate ones of the plurality of different SDN protocols to fulfill the services of the requests. The SDN controller sends to the respective one or more of the plurality of network devices, control messages according to appropriate ones of the plurality of different SDN protocols. Responses are received at the SDN controller from the one or more of the plurality of network devices, each response indicating a failure or a success for a corresponding request. Failures and successes of the responses are associated with appropriate ones of the requests.

11 Claims, 7 Drawing Sheets

(56) References Cited

U.S. PATENT DOCUMENTS

| | | | |
|---|---|---|---|
| 2012/0069740 A1* | 3/2012 | Lu | H04L 45/04 370/238 |
| 2013/0250770 A1* | 9/2013 | Zou | H04L 47/19 370/238 |
| 2013/0329601 A1 | 12/2013 | Yin et al. | |
| 2014/0092765 A1 | 4/2014 | Agarwal et al. | |
| 2014/0119367 A1* | 5/2014 | Han | H04L 12/4633 370/389 |
| 2014/0185450 A1 | 7/2014 | Luo et al. | |
| 2014/0192645 A1* | 7/2014 | Zhang | H04L 47/12 370/235 |
| 2014/0211661 A1 | 7/2014 | Gorkemli et al. | |
| 2015/0200838 A1* | 7/2015 | Nadeau | H04L 45/124 398/58 |
| 2015/0215195 A1* | 7/2015 | Raps | H04L 45/02 370/254 |
| 2015/0250009 A1 | 9/2015 | Kahn et al. | |

\* cited by examiner

TRANSACTION MANAGEMENT IN MULTI-PROTOCOL SDN CONTROLLER

CROSS-REFERENCE TO RELATED APPLICATION

This application claims priority to U.S. Provisional Patent Application No. 61/968,412, filed Mar. 21, 2014, the entirety of which is incorporated herein by reference.

TECHNICAL FIELD

The present disclosure relates to software-defined networking (SDN).

BACKGROUND

An SDN controller is used to communicate with network devices in a network to control various functions of the network devices. SDN controllers tend to support a single particular protocol, such as the OpenFlow protocol, and thus are limited only to greenfield environments. In reality, there are deployments in which there are devices with different capabilities and which are configured to use different SDN protocols.

DESCRIPTION OF EXAMPLE EMBODIMENTS

Overview

A multi-protocol SDN controller handles and manages multiple SDN protocols and heterogeneous set of network devices with different capabilities. The SDN controller receives receiving from one or more applications one or more requests for services to be performed by one or more of a plurality of network devices that communicate with the SDN controller by a plurality of different of SDN protocols. The requests are mapped to appropriate ones of the plurality of different SDN protocols to fulfill the services of the requests. The SDN controller sends to the respective one or more of the plurality of network devices, control messages according to appropriate ones of the plurality of different SDN protocols. Responses are received at the SDN controller from the one or more of the plurality of network devices, each response indicating a failure or a success for a corresponding request. Failures and successes of the responses are associated with appropriate ones of the requests across the plurality of different SDN protocols.

Example Embodiments

Figure 1:
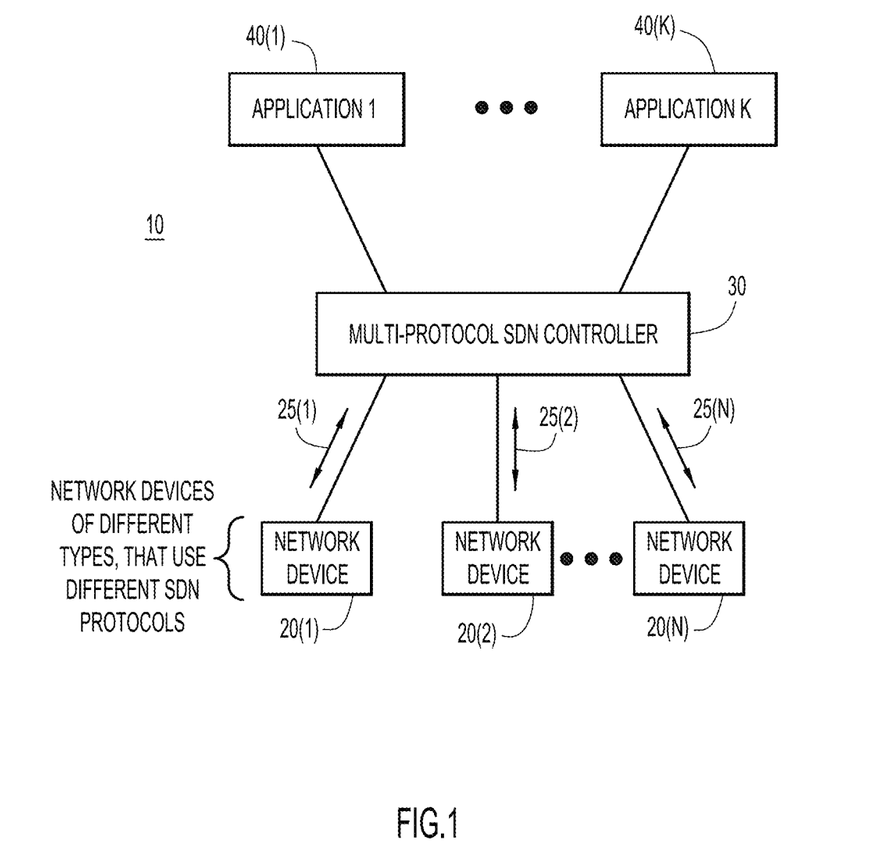
FIG. 1 is a system block diagram showing a SDN controller in a network, according to an example embodiment.

Referring first to FIG. 1, a diagram is shown of a system 10 that includes a plurality of network devices 20(1)-20(N), a Software-Defined Networking (SDN) controller 30 and a plurality of applications 40(1)-40(K). The network devices 20(1)-20(N) may be configured to communicate with the SDN controller 30 using a different one of a plurality of SDN control protocols that are depicted by the arrows labeled 25(1)-25(N) in FIG. 1. Consequently, the SDN controller 30 is a multi-protocol SDN controller in that it can communicate with network devices which use different SDN protocols. There need not be a one-to-one correspondence between SDN protocol and network device. That is, some network devices may be capable of communicating using more than one SDN protocol.

Figure 2:
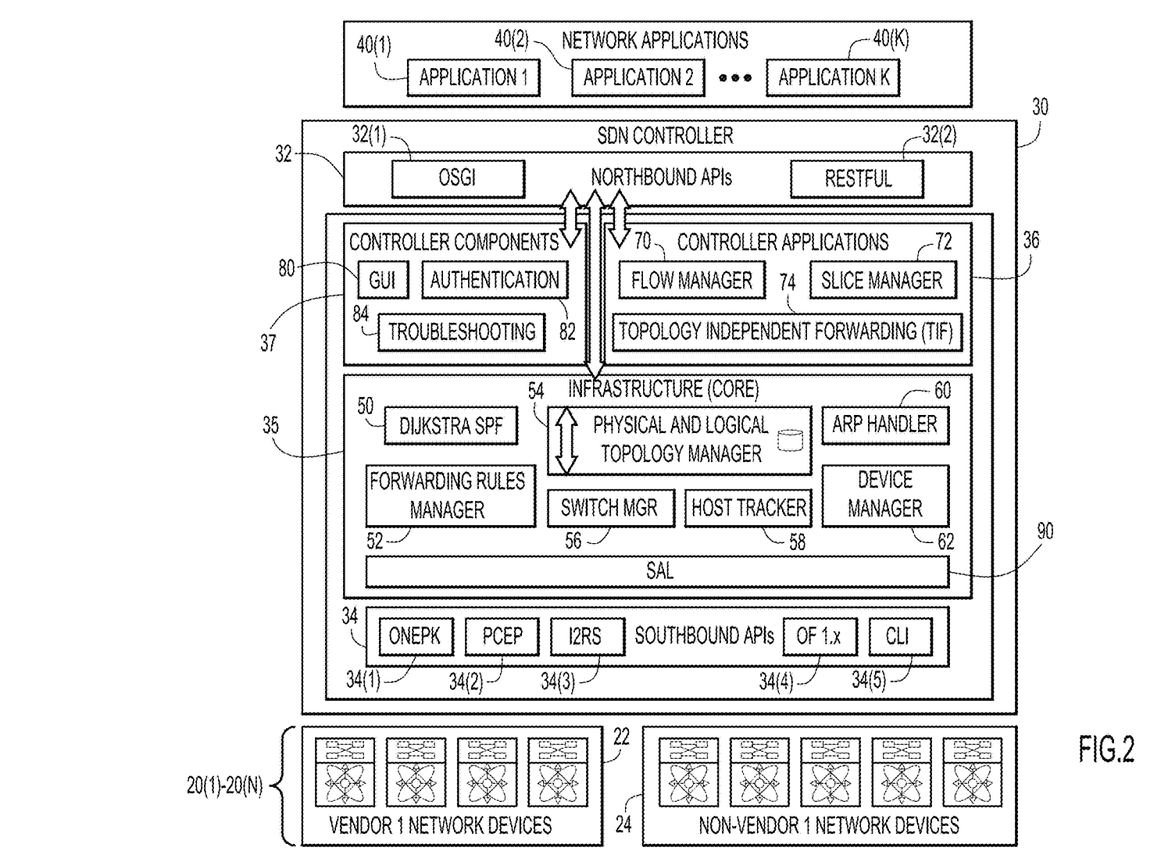
FIG. 2 is an architectural diagram of the SDN controller, applications and network devices, according to an example embodiment.

Turning now to FIG. 2, with continued reference to FIG. 1, the multi-protocol SDN controller 30 can support multiple SDN protocols between it and the network devices 20(1)-20(N) it controls. In the example shown in FIG. 2, the network devices 20(1)-20(N) include network devices from a first vendor (called Vendor 1) shown at reference numeral 22 and network devices from one or more other vendors, called Non-Vendor 1 network devices shown at reference numeral 24.

There are northbound application programming interfaces (APIs) 32 that enable communication between the applications 40(1)-40(k) and the SDN controller 30. The northbound APIs 32 are expandable on demand. Examples of northbound APIs 32 include an API compliant with the Open Service Gateway Initiative (OSGI) 32(1) and a Representational state transfer (RESTful) API 32(2).

Similarly, there are southbound APIs 34 that enable communication between the SDN controller 30 and the network devices 20(1)-20(N). The southbound APIs 34 include dynamic plugins for different SDN communication protocols. Examples of southbound APIs include an API 34(1) compliant with the Cisco One Platform Kit (OnePK), an API 34(2) compliant with the Path Computation Element Communication Protocol (PCEP), an API 34(3) compliant with the Interface to Routing System (I2RS) standard, an API 34(4) compliant with the OpenFlow OF1.x standard, and a Command Line Interface (CLI) 34(4).

The SDN controller 30 includes several functional subsystems, including an infrastructure (core) subsystem 35, a controller applications subsystem 36 and a controller components subsystem 37. All of these subsystems may be implemented as Java™ bundle, in one example.

Examples of functional blocks in the infrastructure subsystem 35 include a Dijkstra Shortest Path First (SPF) 50, Forwarding Rules Manager 52, Physical and Logical Topology Manager 54, Switch Manager 56, Host Tracker 58, Address Resolution Protocol (ARP) Handler 60 and Device Manager 62. The Physical and Logical Topology Manager 54 imports a topology from inventory or other sources. The Dijkstra SPF 50 and Forwarding Rules Manager 52 provide for advanced feature set capabilities.

Examples of functional blocks in the controller applications subsystem 36 include a Flow Manager 70, Slice Manager 72 and Topology Independent Forwarding (TIF) 74. The controller components subsystem 37 includes a Graphical User Interface (GUI) 80, an Authentication block 82 and a Troubleshooting block 84. The components for the controller applications subsystem 36 are used for deployment in a production network.

The applications 40(1)-40(K) running above the SDN controller 30 need to be opaque to the variety of SDN protocols. A Service Abstraction Layer (SAL) 90 is provided that is a shim layer abstraction in the infrastructure subsystem 35.

Network level abstraction enables applications to interface via multiple SDN protocols with network devices in a heterogeneous network (devices in the network support a variety of SDN protocols) in an opaque fashion in order to fulfill desired services by one or more of the protocols. Abstraction is not limited or mapped to any particular protocol. Protocols can change and applications can vary. In addition, support for new protocols can be added as plugins.

Most SDN controllers support only the OpenFlow SDN protocol in the southbound direction (to send control messages from the controller to the network devices) to communicate with the network devices (which in this case is limited to OpenFlow switches). Consequently, the network applications on top of the SDN controller are limited to the capabilities of the OpenFlow switches (and OpenFlow protocol). Also given that the OpenFlow protocol is relatively new at the time of this writing, there are many existing network devices which do not support OpenFlow or cannot be upgraded to support OpenFlow. There are several new protocols that may be developed or are already under development and it is important for SDN controllers to be inclusive and support a wide variety of devices and protocols.

The SAL 90 provides this functionality. The SAL 90 provides a set of services which applications 40(1)-40(K) or modules north of the SDN controller 30 (running on and above the SDN controller) can use. In the southbound direction (from the controller 30 to the network devices 20(1)-20(N)), the SAL 90 supports a multitude of protocols to communicate with network devices depending on the capabilities of the devices. The SAL 90 maps the services to the capabilities of the network devices and selects the appropriate southbound protocol to fulfill (or render) the services.

The SAL 90 provides a plugin mechanism whereby southbound protocol support is developed and attached to the SAL 50. This makes the SDN controller 30 extensible and capable of supporting a network with heterogeneous devices of varying capabilities and capable of communicating using different protocols.

The services exposed by the SAL 90 provide a higher level abstraction that hides the details of the southbound protocol plugins and how a given service is fulfilled (or rendered) by a specific device. It thus allows a given service (associated with an application) to be fulfilled across devices of different capabilities. That is, the SAL 90 provides a path service for a traffic flow to follow in a network made of several different types of network devices.

This path may use any network technology, such as a virtual local area network (VLAN), General Routing Encapsulation (GRE), Multiprotocol Label Switching (MPLS) tunnel or Virtual Extensible Local Area Network (VXLAN) tunnel, etc., depending on the network device capability. To establish this path, the controller programs the device and the SAL allows the controller to use, for example, the OpenFlow protocol with an OpenFlow switch, Simple Network Management Protocol (SNMP) or CLI to configure a non-OpenFlow switch.

The SAL 90 provides the ability to map a higher level abstraction (exposed as service sets) to a device capability, and to the protocol capabilities. In so doing, the SAL 90 selects the appropriate protocol primitives to communicate the service intent to a network device. Examples of protocol APIs that the SAL 90 may abstract to are shown at reference numerals 34(1)-34(5) in FIG. 2 and described above. These southbound protocol APIs are meant only to be examples, and APIs for other protocols now known or hereinafter developed may be supported according to the techniques presented herein.

Figure 3:
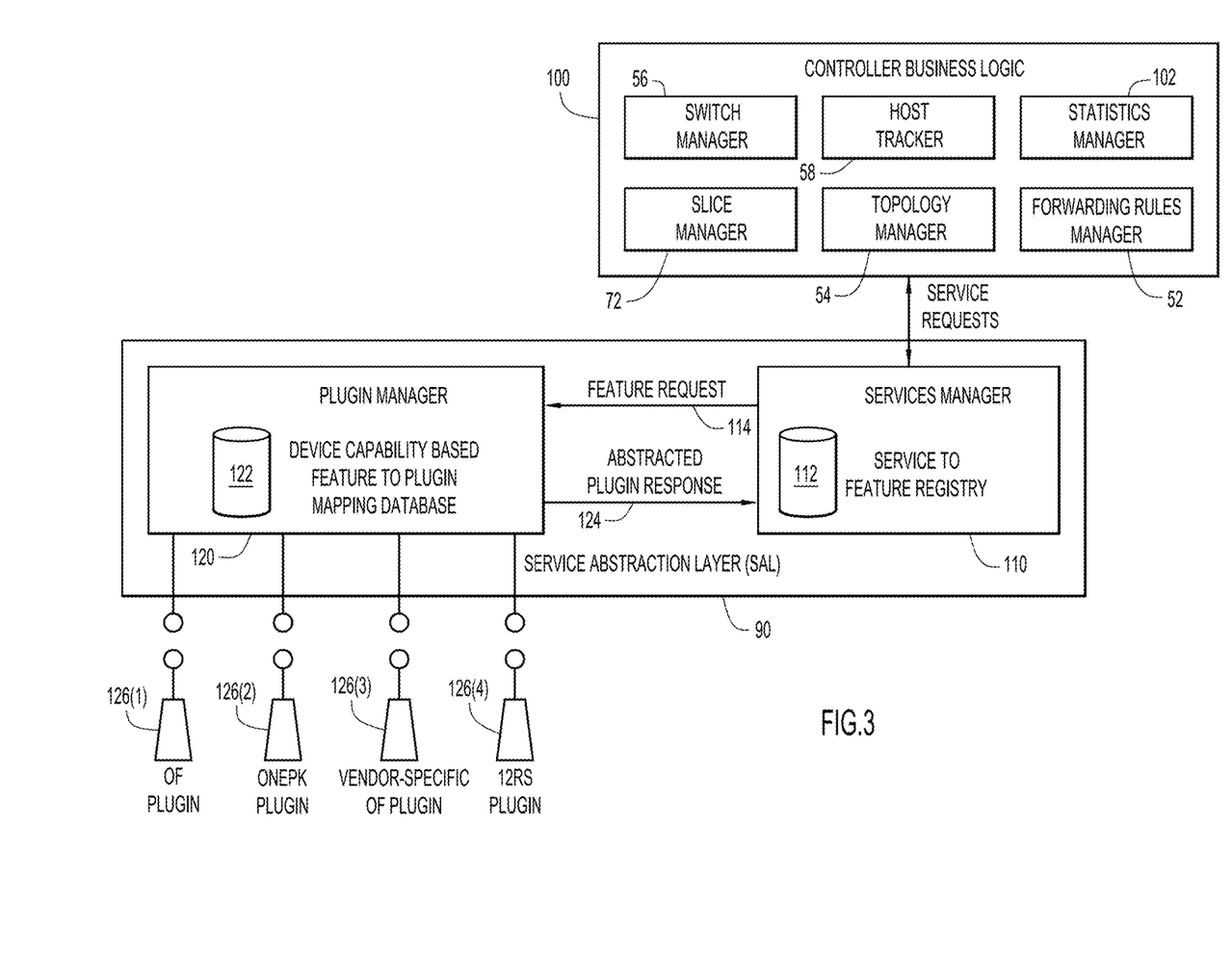
FIG. 3 is a diagram depicting a Service Abstraction Layer of the SDN controller, according to an example embodiment.
Figure 4:
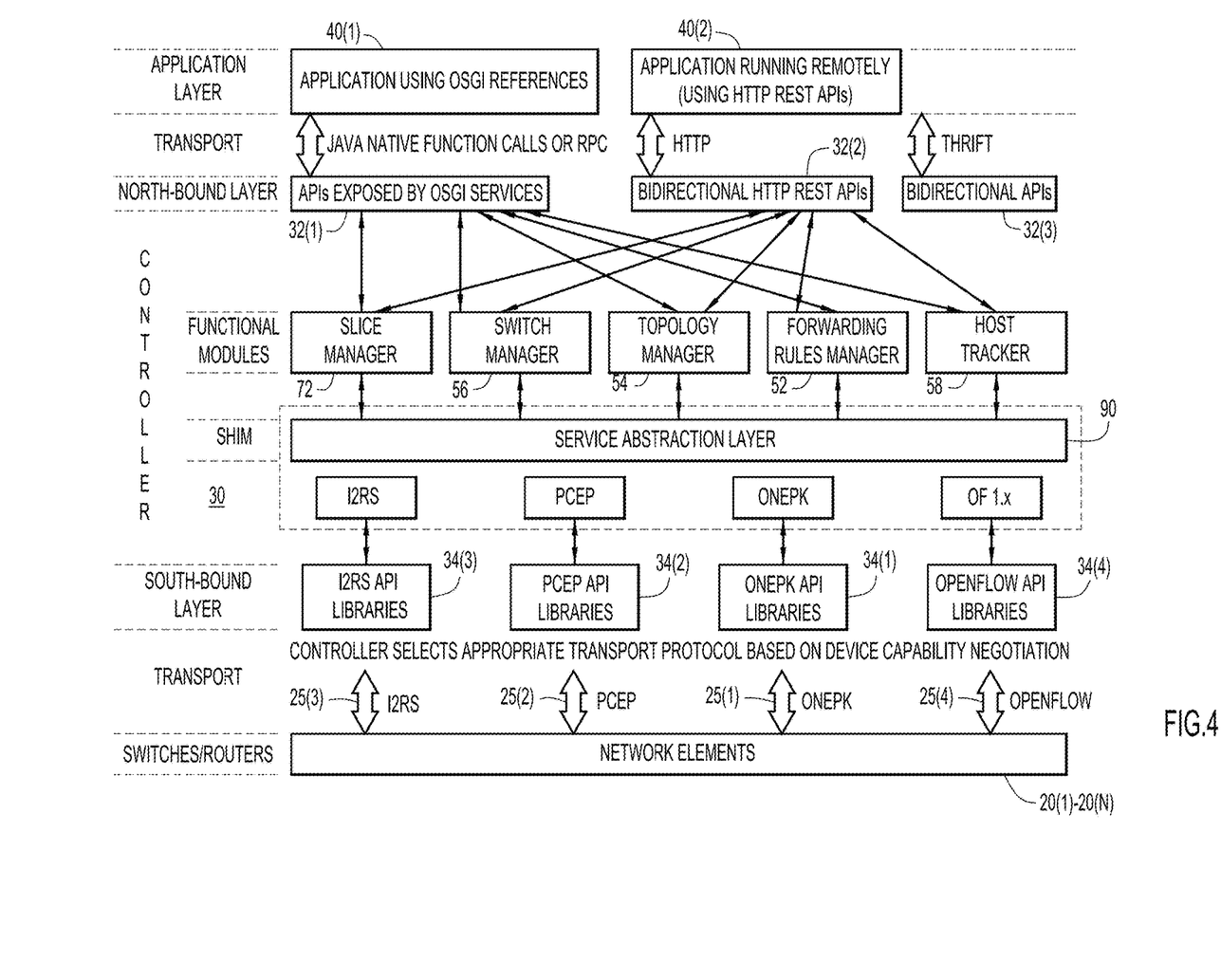
FIG. 4 is a software architectural diagram of the various functional layers of the system depicted in FIG. 2, according to an example embodiment.

Reference is now made to FIGS. 3 and 4. FIG. 3 shows more details of the SAL 90 and FIG. 4 shows how the SAL 50 fits within the overall software architecture of the system depicted in FIG. 2. Business logic modules (shown generally at 100) interact with the SAL 90 through generic service requests and responses. Examples of such business logic modules 100 include the aforementioned Forwarding Manager 52, Topology Manager 54, Switch Manager 56, Host Tracker 58, Slice Manager 72, and a Statistics Manager 102.

The SAL 90 includes a Services Manager 110 and a Plugin Manager 120. The Services Manager 110 manages generic services, such as network device discovery, etc. Services are constructed using individual features exposed by the Plugin Manager 120 (based on Plugin availability and network device capabilities). The Services Manager 110 includes a service-to-feature registry 112. The Plugin Manager includes a database 122 that stores device capability-based feature-to-plugin mapping information. The Services Manager 110 sends and sends a feature request 114 to the Plugin Manager 120 and the Plugin Manager 120 sends an abstracted plugin response 124.

Examples of plugins are shown at 126(1)-126(4), and include an OpenFlow (OF) plugin 126(1), a OnePK plugin 126(2), a vendor-specific OF plugin 126(3) and an I2RS plugin 126(4). Each plugin works independently of one another and is loosely coupled with the Services Manager 110. The Plugin Manager 120 selects plugins dynamically based on the feature request on a given network device or set of network devices.

The SAL 90, and specifically the Plugin Manager 120, is the only place where plugin details are exposed. Therefore, no cross-contamination across plugins and no contamination in business logic layers can occur.

FIG. 4 illustrates a software/functional layer view. In the example shown in FIG. 4, SDN protocols 25(1)-25(4) are shown for use in transporting controls to network elements 20(1)-20(N). The SDN controller 30 selects the appropriate protocol based on device capability negotiation. The SAL 90 invokes select ones of the API libraries 34(1)-34(4). At the northbound side of the controller 30, FIG. 4 shows APIs 32(1) exposed by OSGI services, bidirectional HTTP RESTful APIs 32(2) and another bidirectional API 32(3). An application using OSGI references is shown at reference numeral 40(1). Such an application may run on Java or Python platforms inside a container or remotely, and may communicate via the APIs 32(1) using Java native function calls or Remote Procedure Calls (RPC). Similarly, FIG. 4 shows an application 40(2) that runs remotely and uses HTTP RESTful APIs. APIs 32(3) may be configured to support communication with applications running on the Apache Thrift platform.

Figure 5:
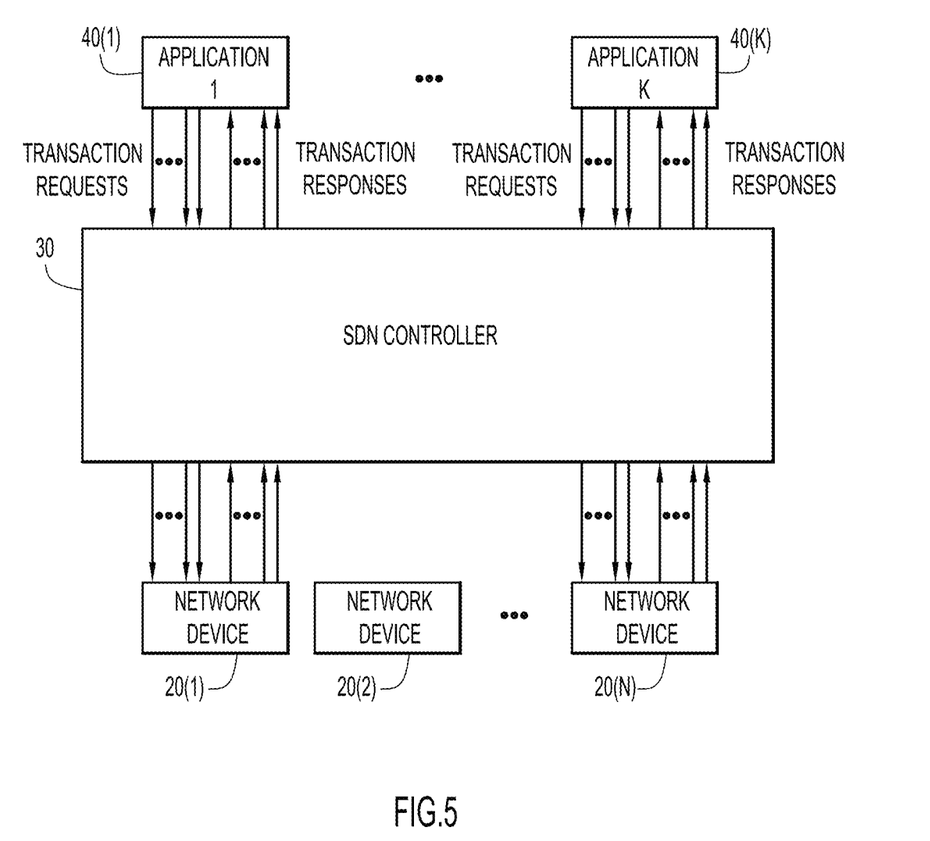
FIG. 5 is a diagram depicting transaction management operations performed by the SDN controller, according to an example embodiment.

FIG. 5 illustrates another function of the SDN controller 30. The multi-protocol SDN controller 30 handles and manages multiple SDN protocols and a heterogeneous set of network devices with different capabilities. The SDN controller rules need to be applied across more than one network device. These rules are applied to the network devices individually. When this occurs, it is possible that the programming of the rules could fail on one of the network devices. Any rollback, notification to the application and/or taking of alternate actions may be needed. This is referred to here as Transaction Management. The SDN controller 30 manages transactional aspects associated with commands/messages sent to multiple network devices across multiple protocols, and associated failures/successes across multiple network devices. Devices along a path could use varying protocols and the SDN controller 30 manages this in a manner that is transparent to the user (applications).

FIG. 5 shows that any given application may be sending one or more transaction requests for any one or several network devices using any one of a plurality of SDN protocols. The SDN controller 50 manages this transaction flow to/from the applications, and to/from the network devices, and across a plurality of different SDN protocols.

Figure 6:
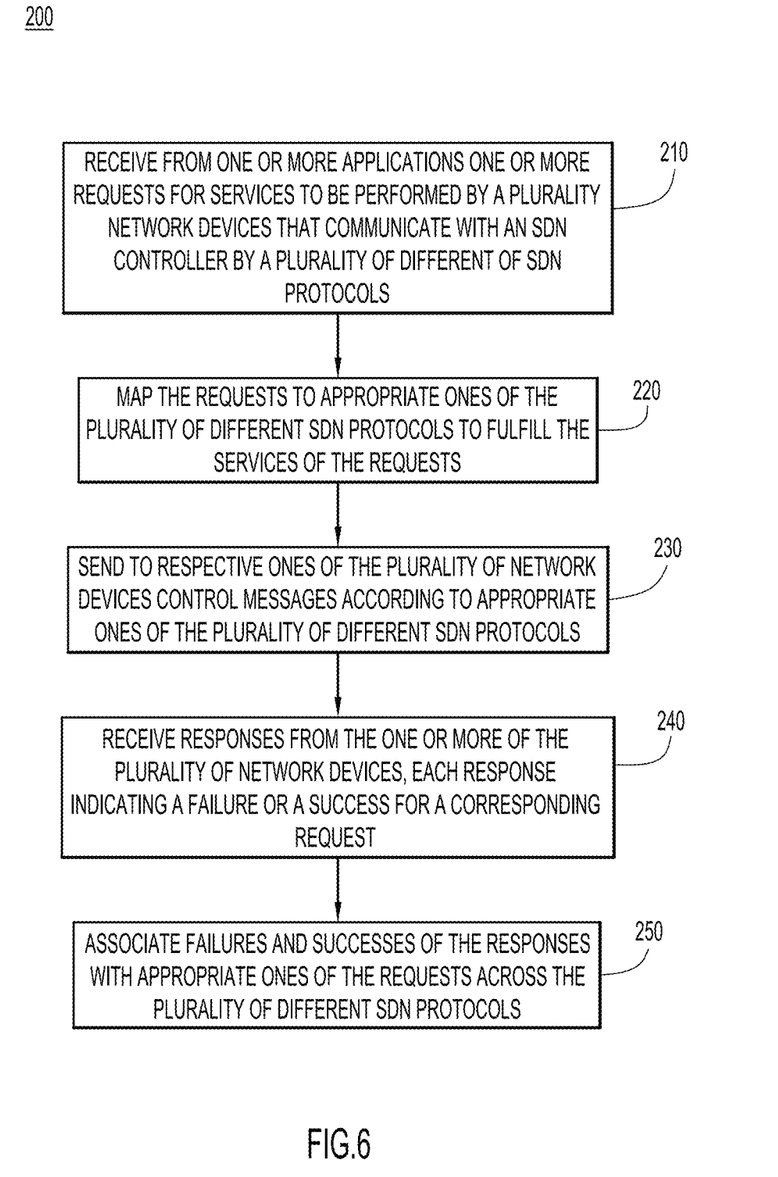
FIG. 6 is a flow chart of a method according to an example embodiment.

Reference is now made to FIG. 6. FIG. 6 illustrates a flow chart depicting operations of a method 200 performed by an SDN controller, according to an example embodiment. At 210, an SDN controller receives from one or more applications one or more requests for services to be performed by a plurality of network devices that communicate with an SDN controller by a plurality of different of SDN protocols. At 220, the SDN controller maps the requests to appropriate ones of the plurality of different SDN protocols to fulfill the services of the requests. At 230, the SDN controller sends to respective ones of the one or more of the plurality of network devices, control messages according to appropriate ones of the plurality of different SDN protocols. At 240, the SDN controller receives responses from the one or more of the plurality of network devices. Each response indicates a failure or a success for a corresponding request. At 250, the SDN controller associates failures and successes of the responses with appropriate ones of the requests across the plurality of different SDN protocols. Thereafter, the SDN controller forwards the response to appropriate ones of the one or more applications.

As explained above, the SDN controller stores, for each SDN protocol, one or more libraries of primitives used for communicating with a network device in accordance with a corresponding SDN protocol. The libraries of primitives provide an abstraction so as to hide details of the plurality of different SDN protocols from the plurality of applications. Thus, the mapping operation involves selecting primitives of respective ones of the plurality of SDN protocols to communicate a request for services of an application to a network device. To do so, the SDN controller stores information that maps network device capability based features to plugins to the plurality of different SDN protocols, and dynamically selects a plugin based on a feature contained in a request to a given network device or set of network devices. Plugins are changed or added to accommodate changes or additions to the SDN protocols.

In summary, the SDN controller includes a services abstraction layer that provides network level abstraction enabling applications to interface via multiple SDN protocols with network devices in a heterogeneous network (devices in the network that supports a variety of SDN protocols) in an opaque fashion in order to fulfill desired services by one or more of the protocols. Abstraction is not limited or mapped to any particular protocol. Protocols can change and applications can vary. Support for new protocols can be added later as plugins.

Moreover, the multi-protocol SDN controller handles and manages multiple SDN protocols and heterogeneous set of network devices with different capabilities. The SDN controller rules are applied across more than one network device. These rules are applied to the network devices individually. When this is occurs, it is possible that the programming of the rules could fail on one of the devices. The SDN controller manages transactional aspects associated with commands/messages sent to multiple network devices across multiple protocols, and associated failures/successes across multiple network devices. Devices along a path could use varying protocols and the SDN controller 30 manages this in a manner that is transparent to the user (applications).

Figure 7:
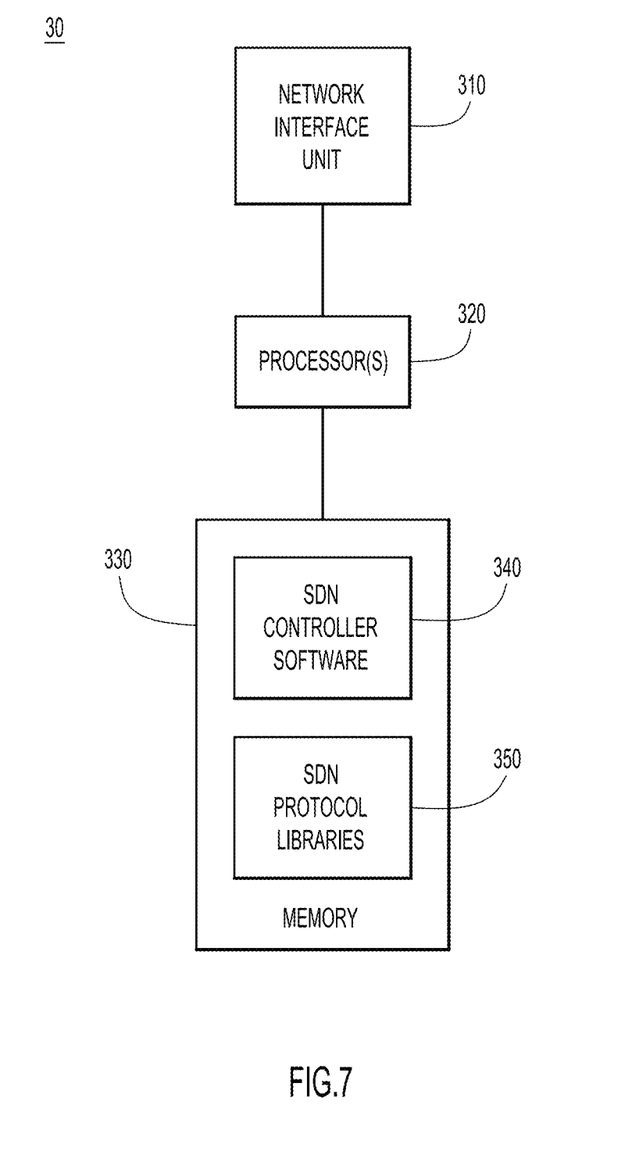
FIG. 7 is a block diagram of the SDN controller, according to an example embodiment.

Turning now to FIG. 7, a block diagram is shown of the SDN controller 30. The SND controller 30 includes a network interface unit 310, one or more processors 320 and memory 330. Within memory 330 are stored software instructions for SDN controller software 340 and also stored data 350 for SDN protocol libraries. The memory 330 may comprise read only memory (ROM), random access memory (RAM), magnetic disk storage media devices, optical storage media devices, flash memory devices, electrical, optical, or other physical/tangible memory storage devices. The processor 320 is, for example, a microprocessor or microcontroller that executes instructions for the SDN controller software 340. Thus, in general, the memory 330 may comprise one or more tangible (non-transitory) computer readable storage media (e.g., a memory device) encoded with software comprising computer executable instructions and when the software is executed (by the processor 320) it is operable to perform the operations described herein in connection with the SDN controller software 340. The SDN controller software 340 may be implemented as a Java™ virtual machine, running on a server in a data center or other cloud computing environment. The SDN controller software 340 includes instructions for performing the functions of the described above in connection with FIGS. 1-6.

To summarize, in one form, a method is provided comprising: A method comprising: at a software defined network (SDN) controller, receiving from one or more applications one or more requests for services to be performed by one or more of a plurality of network devices that communicate with the SDN controller by a plurality of different of SDN protocols; mapping the requests to appropriate ones of the plurality of different SDN protocols to fulfill the services of the requests; sending from the SDN controller to the respective one or more of the plurality of network devices control messages according to appropriate ones of the plurality of different SDN protocols; receiving responses from the one or more of the plurality of network devices, each response indicating a failure or a success for a corresponding request; and associating failures and successes of the responses with appropriate ones of the requests across the plurality of different SDN protocols.

In another form, an apparatus is provided, comprising: a network interface unit to send and receive communications over a network; a memory that stores libraries of primitives used for communicating with network devices in accordance with a plurality of different software defined networking (SDN) protocols; a processor coupled to the network interface, that: maps received requests for services to be performed by a plurality of network devices to appropriate ones of the plurality of SDN protocols; causes control messages to be sent to respective ones of the plurality of network devices according to appropriate ones of the plurality of different SDN protocols; receives responses from the one or more of the plurality of network devices, each response indicating a failure or a success for a corresponding request; and associates failures and successes of the responses with appropriate ones of the requests across the plurality of different SDN protocols.

Further still, in another form, one or more computer readable storage media are provided encoded with software comprising computer executable instructions and when the software is executed by a processor, cause the processor to: map received requests for services to be performed by a plurality of network devices to appropriate ones of a plurality of different software-defined networking (SDN) protocols; cause control messages to be sent to respective ones of the plurality of network devices according to appropriate ones of the plurality of different SDN protocols; receive responses from the one or more of the plurality of network devices, each response indicating a failure or a success for a corresponding request; and associate failures and successes of the responses with appropriate ones of the requests across the plurality of different SDN protocols.

While various embodiments are disclosed herein, it should be understood that they have been presented by way of example only, and not limitation. It will be apparent to persons skilled in the relevant art that various changes in form and detail may be made therein without departing from the spirit and scope of what is described herein. Thus, the breadth and scope of the claims should not be limited by any of the example embodiments disclosed herein.

What is claimed is:

1. A method comprising:
    at a software defined network (SDN) controller, receiving from one or more applications one or more requests for services to be performed by one or more of multiple network devices that communicate with the SDN controller by different SDN protocols;
    storing, for each SDN protocol, one or more libraries of primitives for communicating with corresponding ones of the multiple network devices in accordance with a corresponding SDN protocol so as to provide an abstraction that hides details of the different SDN protocols from the one or more applications;
    mapping, in a services abstraction layer that resides between a Northbound layer exposed to the one or more applications and a Southbound layer exposed to the multiple network devices, the requests for services to appropriate ones of the different SDN protocols to fulfill the services of the requests, wherein the mapping includes, for each request for services:
    generating a feature request from the request for services based on a service-to-feature-registry;
    storing information that maps network device capability based features to multiple plugins each for one of the different SDN protocols; and
    dynamically selecting one of the multiple plugins based on a feature contained in the feature request to a given network device or set of network devices;
    sending from the SDN controller to the respective one or more of the multiple network devices control messages according to appropriate ones of the different SDN protocols;
    receiving responses from the one or more of the multiple network devices, each response indicating a failure or a success for a corresponding request; and
    associating failures and successes of the responses with appropriate ones of the requests across the different SDN protocols, and forwarding the responses to appropriate ones of the one or more applications.

2. The method of claim 1, wherein mapping comprises selecting primitives of respective ones of the different SDN protocols to communicate a request for services of an application to a network device.

3. The method of claim 1, further comprising changing or adding plugins in order to accommodate changes or additions to the SDN protocols.

4. The method of claim 1, wherein the different SDN protocols include at least two of a Cisco One Platform Kit (OnePK) protocol, a Path Computation Element Communication Protocol (PCEP), an Interface to Routing System (I2RS) standard protocol, an OpenFlow OF1.x standard protocol, and a Command Line Interface (CLI) protocol.

5. An apparatus comprising:
    a network interface unit to send and receive communications over a network;
    a memory that stores libraries of primitives used for communicating with multiple network devices in accordance with different software defined networking (SDN) protocols;
    a processor coupled to the network interface unit to:
    store, for each SDN protocol, one or more of the libraries of primitives in accordance with a corresponding SDN protocol so as to provide an abstraction that hides details of the different SDN protocols from multiple applications;
    map, in a services abstraction layer that resides between a Northbound layer exposed to the multiple applications and a Southbound layer exposed to the multiple network devices, received requests for services to be performed by the multiple network devices to appropriate ones of the different SDN protocols, by:
    generating a feature request from the request for services based on a service-to-feature-registry;
    storing information that maps network device capability based features to multiple plugins each for one of the different SDN protocols; and
    dynamically selecting one of the multiple plugins based on a feature contained in the feature request to a given network device or set of network devices;
    cause control messages to be sent to respective ones of the multiple network devices according to appropriate ones of the different SDN protocols;
    receive responses from the one or more of the multiple network devices, each response indicating a failure or a success for a corresponding request; and
    associate failures and successes of the responses with appropriate ones of the requests across the different SDN protocols, and cause the responses to be sent to appropriate ones of the multiple applications.

6. The apparatus of claim 5, wherein the processor is configured to select primitives of respective ones of the different SDN protocols to communicate a request for services of an application to a network device.

7. The apparatus of claim 5, wherein the processor is configured to change or add plugins in order to accommodate changes or additions to the SDN protocols.

8. The apparatus of claim 5, wherein the different SDN protocols include at least two of a Cisco One Platform Kit (OnePK) protocol, a Path Computation Element Communication Protocol (PCEP), an Interface to Routing System (I2RS) standard protocol, an OpenFlow OF1.x standard protocol, and a Command Line Interface (CLI) protocol.

9. One or more non-transitory computer readable storage media encoded with software comprising computer executable instructions and when the software is executed by a processor, cause the processor to:
    store, for each of different software-defined networking (SDN) protocols, one or more libraries of primitives for communicating with multiple network devices in accordance with a corresponding SDN protocol so as to provide an abstraction that hides details of the different SDN protocols from multiple applications;

map, in a services abstraction layer that resides between a Northbound layer exposed to the multiple applications and a Southbound layer exposed to the multiple network devices, received requests for services to be performed by the multiple network devices to appropriate ones of different software-defined networking (SDN) protocols, by:

generating a feature request from the request for services based on a service-to-feature-registry;

storing information that maps network device capability based features to multiple plugins each for one of the different SDN protocols; and dynamically selecting one of the multiple plugins based on a feature contained in the feature request to a given network device or set of network devices;

cause control messages to be sent to respective ones of the multiple network devices according to appropriate ones of the different SDN protocols;

receive responses from the one or more of the multiple network devices, each response indicating a failure or a success for a corresponding request; and associate failures and successes of the responses with appropriate ones of the requests across the different SDN protocols, and send the responses to appropriate ones of the multiple applications.

10. The computer readable storage media of claim 9, wherein the instructions that, when executed, cause the processor to map comprise instructions that cause the processor to select primitives of respective ones of the different SDN protocols to communicate a request for services of an application to a network device.

11. The computer readable storage media of claim 9, wherein the different SDN protocols include at least two of a Cisco One Platform Kit (OnePK) protocol, a Path Computation Element Communication Protocol (PCEP), an Interface to Routing System (I2RS) standard protocol, an OpenFlow OF1.x standard protocol, and a Command Line Interface (CLI) protocol.

* * * * *